UNITED STATES PATENT OFFICE 2,299,128

POLYMERIZABLE COMPOSITION

Laurence William Codd, Addlestone, and Frederick Thomas Hamblin, Norton-on-Tees, England, assignors to Imperial Chemical Industries Limited, a corporation of Great Britain No Drawing. Application August 16, 1939, Serial No. 290,490. In Great Britain August 19, 1938

4 Claims. (Cl. 260—486)

This invention relates to improvements in polymerizable compositions and, more particularly, to such compositions when comprising monomeric or partially polymerized organic compounds containing the group

or mixtures of the monomeric and polymeric forms of such compounds.

Proposals for the utilization of such materials by polymerization processes have suffered from the disadvantage that the monomeric material always possesses a considerable tendency to polymerize spontaneously so that monomer cannot economically be stored for any substantial period. To overcome this objection, it has been proposed to add to the monomer substances having an inhibitory effect upon the polymerization reaction, such as hydroquinone.

These previously proposed inhibitors enable the monomer to be stored satisfactorily but, when polymerization is required to be effected, it can only be accomplished either by the admixture of sufficient polymerization catalyst to overcome the effect of the inhibitor or by removal of the inhibitor. The former method is wasteful since it necessitates the use of increased amounts of catalyst, while the latter method is, in practice, invariably inconvenient. In certain cases, it may be not only inconvenient but practically impossible to mix polymerization catalysts with the material to be polymerized. Thus, for many purposes it is advantageous to employ as the polymerizable material a mixture of monomer and polymer in such proportions that the composition is spongy or rubbery. With such a composition it is not at all easy to admix uniformly and satisfactorily a catalyst to promote polymerization and, consequently, the ordinary inhibitors are of no use in assisting storage of such materials.

Even in those cases where the polymerizable mixture is of sufficient fluidity to permit incorporation of catalysts, economy in the consumption of catalyst may be effected by the use of the present invention.

An object of the present invention is to provide a means of stabilizing polymerizable compounds so that they can be satisfactorily stored without danger of polymerization and yet not involve the disadvantages discussed above when it is desired to polymerize them. A more particular object is to provide a polymerization inhibitor which will effectively inhibit polymerization of a polymerizable compound at room temperature but which has no appreciable effect on the polymerization of such compound at elevated temperatures. Other objects will be apparent from the description of the invention given hereinafter.

The above objects are accomplished according to the present invention by mixing with a polymerizable organic compound containing the group

in inhibitor proportions, a substance having an inhibiting effect upon polymerization of the organic compound at room temperature but which loses this inhibiting effect at an elevated temperature at which it is desired to polymerize the organic compound.

This so-called "instability" in the inhibitor may be attained by employing an inhibitor which is volatile at the temperature at which it would ordinarily be desired to effect polymerization, or one which, at the temperature of polymerization, decomposes into products having no inhibitory effect.

By employing such an inhibitor, the necessity for adding a polymerization catalyst at the time of polymerization is avoided; as soon as the inhibitor is destroyed, polymerization may be effected by known means using heat or light just as if no inhibitor had been introduced into the polymerizable compound. If desired, a polymerization catalyst may be incorporated in the polymerizable compound either at the time of introducing the inhibitor or at the time it is desired to polymerize the compound. If the catalyst is introduced with the inhibitor, it will exhibit its normal activity as soon as the inhibitor has been destroyed. If the catalyst is introduced after the inhibitor has been destroyed, it will simply function as the same catalyst would function in the polymerization of material that had never been inhibited. Where the polymerization catalyst and the inhibitor are present in the polymerizable compound at the same time, it is necessary to select catalysts and inhibitors which do not mutually react with one another.

The present invention is applicable to polymerizable compounds whether such compounds are entirely in the monomeric state or consist of a mixture of monomer and polymer or are in a partially polymerized state.

The inhibitors of the present invention may be used to inhibit the whole class of polymerizable organic compounds containing the group

Prominent among such compounds may be mentioned acrylic, methacrylic, and homologous acids, their nitriles and esters, as well as styrene, alpha methyl styrene, and the various vinyl halides and esters. Specific esters adapted to be stabilized in accordance with the present invention include:

| | |
|---|---|
| Methyl methacrylate | Cyclohexyl methacrylate |
| Ethyl methacrylate | Para cyclohexyl phenyl methacrylate |
| Butyl methacrylate | Decahydro-beta-naphthol methacrylate |
| Isobutyl methacrylate | Di-isopropyl carbinol methacrylate |
| Secondary butyl methacrylate | Furfuryl methacrylate |
| Tertiary amyl methacrylate | Tetrahydro furfuryl methacrylate |
| Phenyl methacrylate | Methyl acrylate |
| Glycol monomethacrylate | Ethyl acrylate |
| Glycol dimethacrylate | Butyl acrylate |

It will be understood that the present invention is likewise applicable to mixtures of polymerizable compounds, such mixtures being adapted on polymerization to give interpolymers.

The choice of inhibitor and the exact proportion to be used in any specific instance will be dependent upon the polymerizable compound to be stabilized and some preliminary experimental work may be necessary to determine the optimum inhibitor and the optimum proportions for specific cases. However, it has been found, for example, with monomeric methyl methacrylate, that all of the inhibitors given in the following table satisfactorily inhibit polymerization of the methyl methacrylate nuder normal storage conditions whereas polymerization could be effected at 100° C. substantially as readily as if no inhibitor had ever been introduced into the composition. In the following table the time taken to reach a standard degree of polymerization in the various inhibited compositions at 100° C. is given:

*Table*

| Composition to be polymerized | Time taken to reach a standard degree of polymerization | |
|---|---|---|
| | Hr. | Min. |
| Methyl methacrylate | 1 | 30 |
| Methyl methacrylate +0.1% benzoic acid | 1 | 20 |
| Methyl methacrylate +0.1% acetamide | 1 | 30 |
| Methyl methacrylate +0.1% crotonic acid | 1 | 30 |
| Methyl methacrylate +0.1% ammonium carbonate | 1 | 40 |
| Methyl methacrylate +0.1% ammonia | 1 | 50 |
| Methyl methacrylate +0.1% pyrrol | 2 | 0 |
| Methyl methacrylate +0.1% piperidine | 2 | 5 |
| Methyl methacrylate +0.1% ammonium carbamate | 2 | 25 |
| Methyl methacrylate +0.1% hexamine | 1 | 55 |
| Methyl methacrylate +0.1% aldehyde ammonia | 2 | 10 |

All of the above compositions were stored at temperatures up to 50° C. for fourteen days without appreciable thickening taking place. In the above table the percentages given are by weight of the methyl methacrylate employed.

As those skilled in the art will understand, the proportion of inhibitor used will normally be very small although it will be varied to some extent depending upon the inhibitor used, the polymerizable compound being inhibited, and the particular conditions of storage to which the polymerizable compound is to be subjected. An amount of inhibitor as low as 0.01% by weight of the polymerizable compound is generally effective for ordinary conditions although, aside from reasons of economy, the proportion of inhibitor could be far greater. That there would be any practical reason for employing greater than 1.0% of inhibitor by weight of the polymerizable compound being inhibited, is doubtful, although the use of a greater amount of inhibitor is not excluded by the present invention.

It will be apparent that the primary advantage in the present invention is that a means is provided for inhibiting polymerization of polymerizable compounds during storage and permitting the polymerization of these compounds with no greater difficulty than the uninhibited compounds could be polymerized. In view of the difficulty encountered with polymerization of polymerizable compounds that have been inhibited with inhibitors heretofore known, it is obvious that this is a very substantial practical advantage. Further, under certain circumstances, there is no feasible means of overcoming the inhibiting effect of heretofore known inhibitors, even if the economy of the operation were of no importance.

The present invention is particularly advantageous in its application to the manufacture of dentures made from polymerizable compounds. Dentures of this type are conveniently made by mixing together a monomer and polymer and molding the mixture but, in usual circumstances, this involves preserving either the monomer by itself or in admixture with polymer for appreciable periods without spontaneous polymerization of the monomer. The inhibitors of the present invention not only prevent the spontaneous polymerization of the monomer under any normal storage conditions but are of great value in that they do not complicate the polymerization when the monomer-polymer mixture is to be molded into a denture, this molding usually being done by men not necessarily skilled in chemical manipulations.

The dentures discussed above are largely made, according to present practice, by molding a mixture of monomeric and polymeric methyl methacrylate and it has been found that the introduction of an inhibitor in the amount of 0.1% by weight of the monomeric methyl methacrylate, into the monomer satisfactorily inhibits it under the usual conditions encountered regardless of whether the monomer is stored by itself or is intimately mixed with polymer, and yet permits the molding of the denture to proceed as simply as if fresh uninhibited monomer were used.

As many apparently widely different embodiments of this invention may be made without departing from the spirit and scope thereof, it is to be understood that the invention is not limited to the specific embodiments thereof except as defined in the appended claims.

We claim:

1. A composition comprising polymerizable methyl methacrylate and, as a polymerization inhibitor therefor, about 0.1%, by weight of said methyl methacrylate, of a compound from the group consisting of acetamide, ammonium carbonate, ammonia, pyrrol, piperidine, ammonium carbamate, hexamine, and aldehyde ammonia.

2. A composition comprising polymerizable methyl methacrylate and, as a polymerization inhibitor therefor, about 0.1%, by weight of said methyl methacrylate of piperidine.

3. A composition comprising polymerizable methyl methacrylate and, as a polymerization inhibitor therefor, about 0.1%, by weight of said methyl methacrylate of ammonia.

4. A composition comprising polymerizable methyl methacrylate and, as a polymerization inhibitor therefor, about 0.1%, by weight of said methyl methacrylate of ammonium carbamate.

FREDERICK THOMAS HAMBLIN.
LAURENCE WILLIAM CODD.